United States Patent [19]

Alaniz

[11] 4,240,460
[45] Dec. 23, 1980

[54] MEANS FOR LIMITING FLOATING MOVEMENT OF GATE VALVE SEATS

[75] Inventor: Ruben G. Alaniz, Houston, Tex.

[73] Assignee: ACF Industries, Incorporated, New York, N.Y.

[21] Appl. No.: 88,876

[22] Filed: Oct. 29, 1979

[51] Int. Cl.³ .................................................. F16K 43/00
[52] U.S. Cl. .................................. 137/327; 251/196; 251/328
[58] Field of Search ................ 137/315, 327; 251/167, 251/195, 328, 196

[56] References Cited

U.S. PATENT DOCUMENTS

| 3,175,802 | 3/1965 | Bredtschneider | 251/328 |
|---|---|---|---|
| 3,219,055 | 11/1965 | Dumm | 137/327 X |
| 3,937,441 | 2/1976 | Baumann | 137/315 X |
| 4,151,855 | 5/1979 | Levin | 137/315 X |
| 4,175,577 | 11/1979 | Kacal | 137/315 X |

*Primary Examiner*—Harold W. Weakley
*Attorney, Agent, or Firm*—Stephen T. Belsheim

[57] ABSTRACT

A two-piece retainer ring fits within opposed grooves (80,82) in a gate valve seat (64) and the adjacent valve body (12). The opposed grooves are of a width greater than the width of the two ring segments (84) comprising the two-piece ring and limit the movement of the associated floating seat (64). A wave spring (86) urges the ring segments (84) radially outwardly in the grooves and an access opening (88) to the grooves permits the ring segments (84) to be actuated by a suitable tool for removal of the seat, if desired.

8 Claims, 7 Drawing Figures

MEANS FOR LIMITING FLOATING MOVEMENT OF GATE VALVE SEATS

BACKGROUND OF THE INVENTION

This invention relates to gate valves and more particularly to gate valves of the expanding type which expand laterally at fully open and fully closed positions.

Expanding gate valves include a gate and a segment carried by the gate with relative longitudinal movement between the gate and segment effecting a lateral expansion of the gate valve. It is desirable that the gate and segment remain in a collapsed or contracted relation during travel between open and closed positions so that binding against the seats will not occur. Also, it is desirable to limit the movement of the seats toward the gate assembly so a minimum clearance is provided as the gate assembly moves between open and closed positions. So-called floating seats are oftentimes employed with expanding gate valves and various means have been provided to limit the floating movement of the seats toward the gate assembly. For example, U.S. Pat. No. 4,116,419 dated Sept. 26, 1978 discloses an arrangement for limiting the floating movement of the seats toward the gate assembly by the use of an L-shaped retainer. Other means have included flanges or shoulders on the seat supports for limiting the movement of the seats toward the gate assembly.

SUMMARY OF THE INVENTION

The present invention is directed to a seat arrangement for an expanding gate valve in which the movement of floating opposed seats toward the adjacent gate assembly is limited. The means to limit the inward floating movement of the seats toward the gate assembly includes a pair of semi-circular ring segments which fit loosely within an annular pocket formed by a pair of opposed annular grooves in the seat and the adjacent valve body. The ring segments are urged radially outwardly in the grooves by a wave spring and retain the associated seat within an annular recess or counterbore in the valve body while limiting the movement of the seat toward the gate assembly. The retaining ring segments will snap into position under the bias of the wave spring when the seat is initially inserted within the seat pocket formed by the counterbore.

In the event it is desired to remove the seat for repair or replacement, a tool access opening for each ring segment which communicates with the grooves is provided, either through the adjacent valve body or through the seat, and a suitable tool may be inserted within the access opening to push the associated ring segment into one of the facing grooves so that the ring segment might be slipped out its pocket.

DETAILED DESCRIPTION OF THE DRAWINGS

Figures 1, 6:
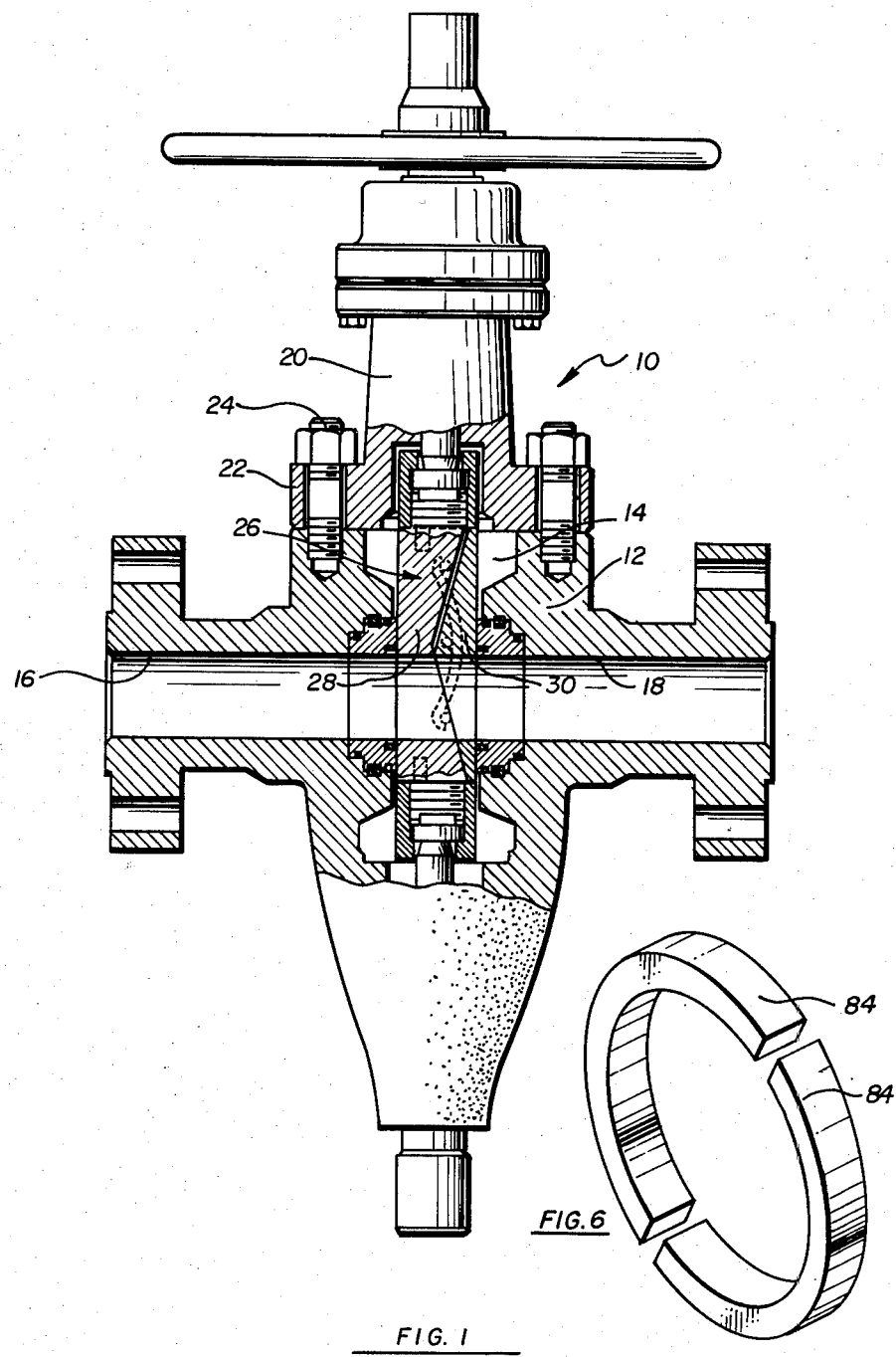
FIG. 1 is an elevational view of an expanding gate valve with a central portion thereof broken away to show the gate assembly and the floating seats of the invention.
FIG. 6 is a perspective view of the semi-circular ring segments removed from the gate valve.

Referring now to the drawings for a better understanding of the invention, and more particularly to FIG. 1, a gate valve of the expanding type is illustrated generally at 10 and includes a valve body 12 with a valve chamber 14 and inlet and outlet passageways 16 and 18 extending through the valve body in fluid communication with valve chamber 14. A valve bonnet 20 has a lower flange 22 bolted at 24 to body 12. The gate assembly generally indicated at 26 is mounted within valve chamber 14 for travel between open and closed positions and includes a gate 28 and a segment 30 carried thereby. A threaded extension 32 extends from the upper end of gate 28 and a stem 34 is connected to threaded extension 32 by a nut 36 which is threaded onto extension 32. Gate valve 10 is a so-called balanced stem design and has a lower stem 38 which is connected to lower extension 39 on gate 28 by nut 41 to balance pressures acting on opposite sides of the gate valve to provide a gate valve particularly adaptable for high fluid pressures such as around 20,000 psi.

Figure 2:
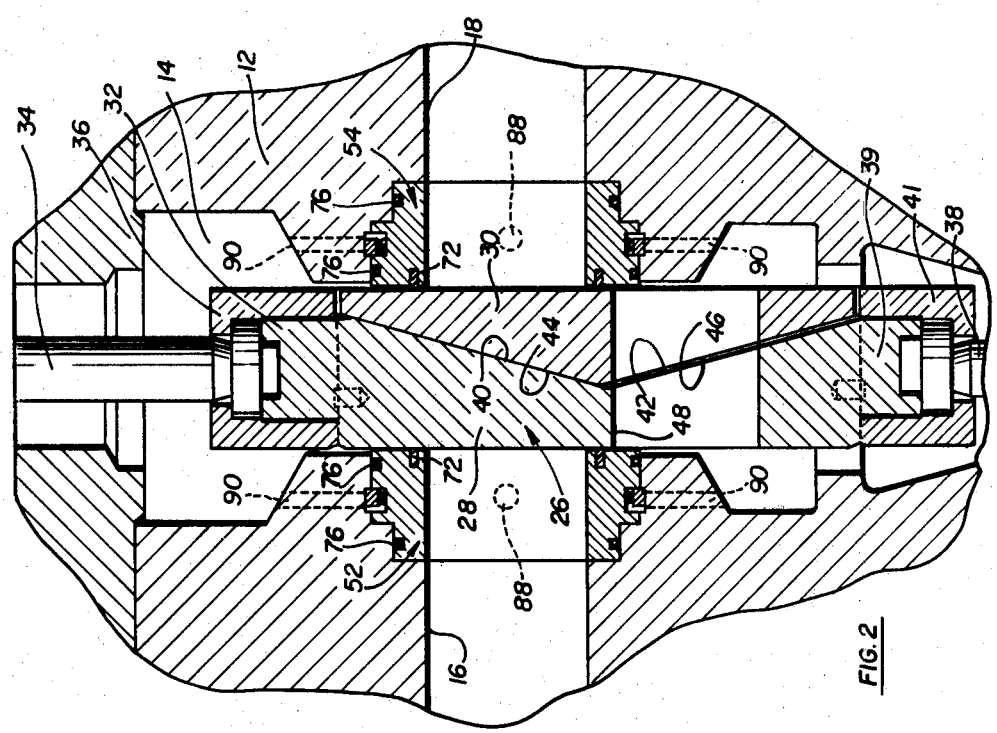
FIG. 2 is an enlarged sectional view of the gate assembly and adjacent seats with the gate and segment shown in a fully expanded, closed position in tight sealing relation with associated seats.
Figure 3:
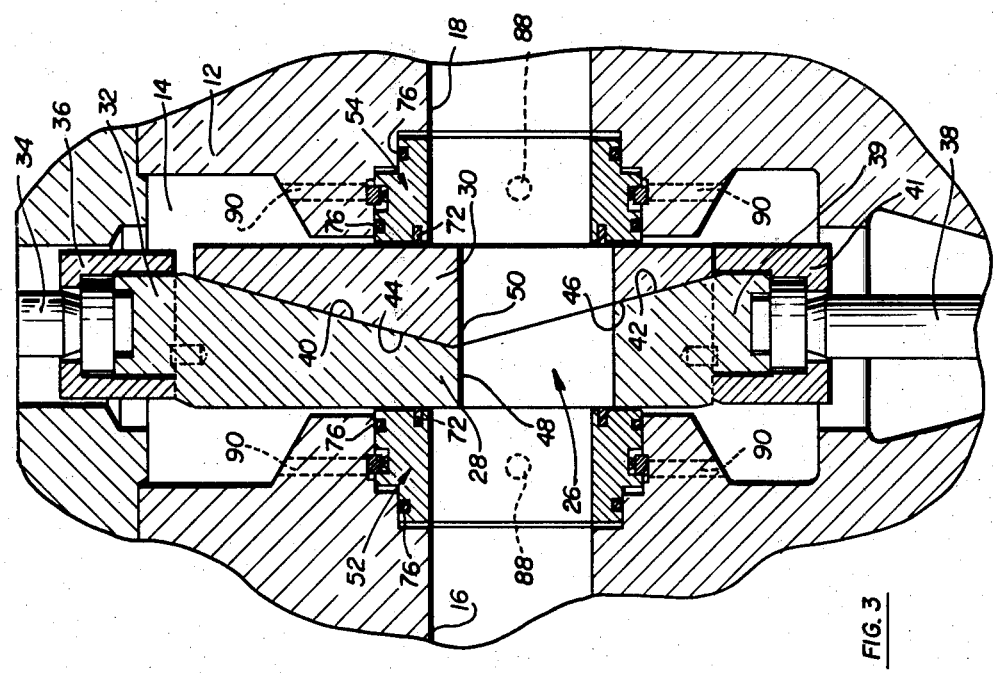
FIG. 3 is a sectional view similar to FIG. 2 but showing the valve assembly with the gate and segment in a collapsed position for traveling between open and closed positions, the seats being limited in movement toward the gate valve assembly by the ring segments in the opposed grooves.

Gate 28 has a V-shaped recess defined by an upper surface 40 and a lower surface 42. Segment 30 has a V-shaped extension fitting within the recess of gate 26 defined by upper inclined surface 44 and lower inclined surface 46 which are disposed in opposed relation to respective surfaces 40 and 42. Surfaces 40 and 42 are inclined with respect to the travel of gate assembly 26 in open and closed positions at an angle of around 12° to 16° to effect lateral expansion of the gate 28 and segment 30 at the fully open and closed positions as will be explained. Gate 28 has a bore 48 therethrough and segment 30 has a bore 50 therethrough. Bores 48 and 50 align with inlet and outlet passageways 16 and 18 in the open position of valve assembly 26. FIG. 3 shows segment 30 and gate 28 in a collapsed or contracted position in which surfaces 40 and 42 of gate 26 are in full seating relation with opposed surfaces 44 and 46 of segment 30. FIG. 2 shows gate valve assembly 26 at the fully closed position in which gate 28 and segment 30 are expanded laterally and in tight sealing engagement with the adjacent upstream and downstream seat assemblies generally indicated at 52 and 54. Seat assemblies 52 and 54 are generally identical and for the purposes of illustration only the downstream seat assembly 54 is illustrated in detail, it being understood that similar reference numerals indicate similar parts in upstream seat assembly 52.

Valve body 12 has a seat pocket therein receiving seat assembly 54 formed by an annular recess defining an outer peripheral wall 56 and an intermediate peripheral wall 58. A pair of stepped rear shoulders 60 and 62 are formed by the annular recess and extend generally at right angles to peripheral walls 56 and 58. Downstream sealing assembly 54 includes a seat ring 64 having an outer peripheral surface 66 and an intermediate peripheral surface 68. A front face 70 of seat ring 64 has a resilient face seal 72 fitting within a groove in face 70. Rear faces 72 and 74 of seat ring 64 are adapted to seat against shoulders 72 and 74 in the full seated position within the seat pocket as shown in FIG. 2. O-rings 76 fit within grooves in peripheral surfaces 66 and 68 to seal against adjacent valve body 12.

The present invention comprises means to hold seat ring 64 in position within the seat pocket and to limit the floating movement of seat ring 64 toward gate assembly 26. To accomplish this, a groove 80 is formed in peripheral wall 56 of valve body 12, and an opposed groove 82 is formed in outer periphery 66 of seat ring 64 as shown particularly in FIG. 5. A releasable retaining ring is provided by two generally semi-circular ring segments 84 which fit within grooves 80, 82 as shown particularly in FIG. 5. A wave spring 86 is mounted in groove 82 and continuously urges ring segments 84 outwardly to a seated position against the bottom of groove 80. The thickness of ring segments 84 is indicated at "T", the depth of groove 82 is indicated at "D" and the depth of groove 80 is indicated at "D1" as shown particularly in FIG. 5. Thickness "T" of ring segments 84 is greater than depth "D1" of groove 66 but less than depth "D" of groove 82 in which wave spring 86 is provided.

The width of ring segments 84 is indicated at "W" and the width of grooves 80 and 82 is indicated at "W1" which is greater than width "W" thereby permitting a floating movement of seat ring 64 toward and away from the adjacent sealing surface of segment 30.

As shown in FIG. 2 in which gate valve assembly 26 is shown in a fully closed position, seat assemblies 52 and 54 are urged outwardly by the adjacent sealing faces of the gate valve assembly 26 with the rear faces of the seat assembly 52 and 54 being in engagement with the adjacent shoulders 60 and 62 of the seat pocket. In this position, face seal 72 seals tightly against the adjacent sealing surface of gate valve assembly 26.

Figure 5:
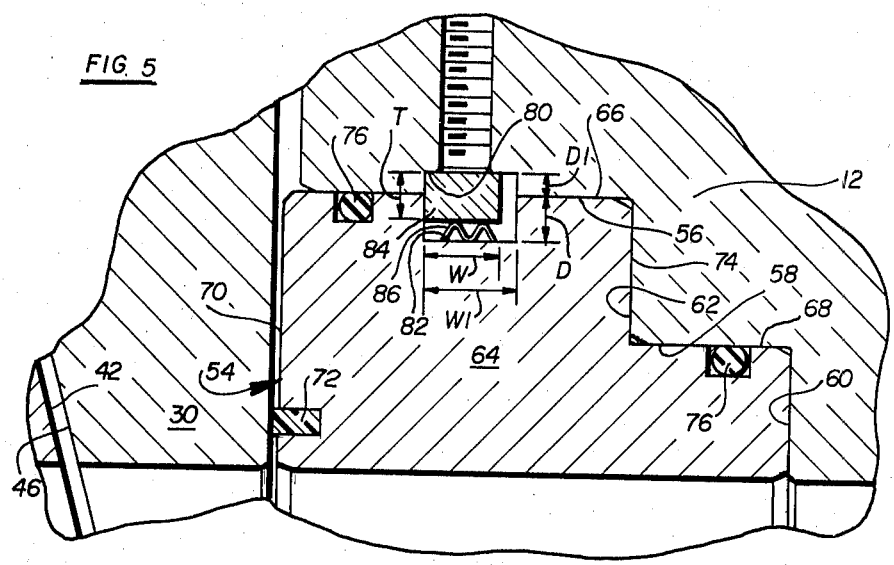
FIG. 5 is an enlarged section of the seat assembly showing the seat ring at the fully expanded position of the gate assembly.
Figure 4:
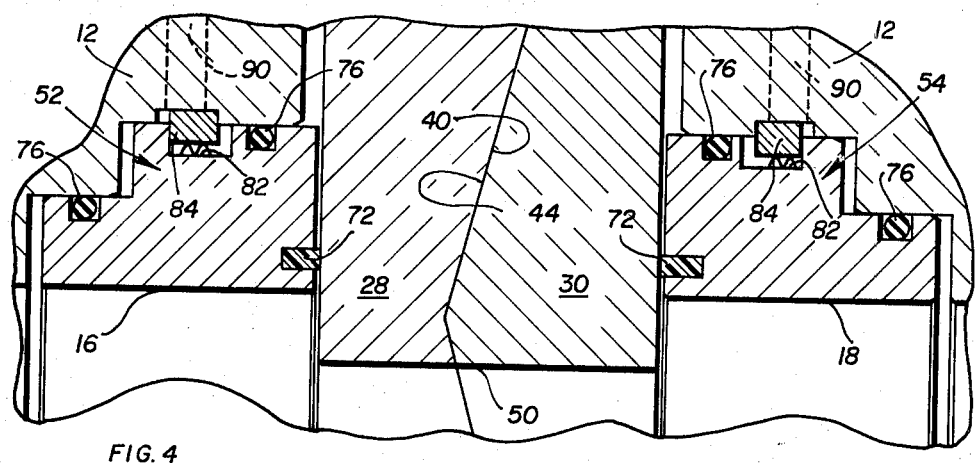
FIG. 4 is an enlarged fragment of FIG. 3 showing the inward movement of the valve seat being limited by the ring segments.

In the position of FIGS. 3 and 5, segment 30 and gate 28 are shown in a collapsed position for travel between open and closed positions and in this position the movement of seat assemblies 52 and 54 toward gate assembly 26 is stopped by ring segments 84 with the sides of grooves 82 contacting the sides of ring segments 84 to restrict or limit the floating movement of seat assemblies 52 and 54 thereby to minimize binding of gate assembly 26 against seat assemblies 52 and 54. The combined inward movement of seat assemblies 52 and 54 toward gate assembly 26 during travel is limited to a predetermined amount adequate to provide a small clearance between face seals 72 and gate assembly 26 in the collapsed position thereof as shown in FIG. 3. This minimizes the operating torque required for moving gate assembly 26 between open and closed positions.

In the event it is desired to remove seat ring 64 for repair or assembly, a threaded lubricant fitting opening indicated at 88 communicates with groove 80 and is provided for each ring segment 84 generally centrally of the length of segment 84. Suitable means, such as a bead in groove 80, is provided to position segment 84 with respect to opening 88. A suitable tool may be inserted within opening 88 to press ring segment 84 inwardly against the bias of wave spring 86 so that segment 84 is received within groove 82. Then, seat ring 64 may be removed from its pocket for repair or replacement. Additional tool access openings indicated at 90 may be provided and are accessible from valve chamber 14. In the embodiment shown in FIGS. 2-6, the seat may be removed with the valve remaining in place within a line upon removal of the bonnet and associated gate assembly.

From the foregoing, it is believed apparent that the novel retaining ring segments 84 utilized for holding valve seats 64 within the seat pockets can be utilized to control the floating movement of valve seats 64 by a suitable dimensioning of the associated grooves 80, 82 and ring segments 84. Ring segments 84 can be easily positioned by insertion within the seat pocket with the seat ring and the wave springs will snap ring segments 84 outwardly into groove 80 of valve body 12. Likewise, ring segments 84 may be pushed inwardly by a tool to permit removal of the seat ring.

Figure 7:
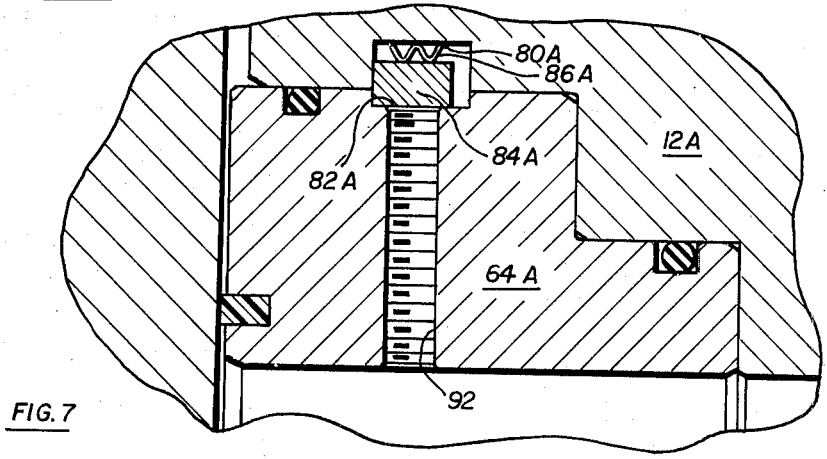
FIG. 7 is an enlarged sectional view of a separate embodiment of the invention showing the ring segments seated within the inner groove and a tool access opening through the seat.

A separate embodiment is shown in FIG. 7 in which a wave spring 86A is positioned in groove 80A and urges segment 84A inwardly to seat against the bottom of groove 82A in seat ring 64A. A suitable tool may be inserted within access opening 92 in seat ring 64A which communicates with groove 82A to urge segment 84A outwardly within the confines of groove 80A in the adjacent valve body 12A and then seat ring 64A may be removed from its seat pocket. With this embodiment, access may be obtained through the inlet or outlet conduits after the valve is removed from an operating line.

What is claimed is:

1. In a gate valve having a valve body with a valve chamber therein and inlet and outlet flow passages communicating with the valve chamber, an expanding gate valve assembly mounted within the valve chamber for movement between open and closed positions, said gate valve assembly including a gate and a segment with the gate and segment expanding laterally away from each other at the fully closed position, and an annular seat pocket about each of the flow passages:
   the improvement comprising an annular seat mounted in each seat pocket for limited floating movement, the outer circumference of said seat and the adjacent annular wall of said seat pocket having opposed annular grooves therein, and a pair of substantially semi-circular retainer ring segments mounted in said grooves and being of a thickness greater than the depth of one of the grooves to retain the annular seat within the seat pocket, the width of the ring segments being less than the width of said grooves to permit a limited floating movement of the seat within the seat pocket.

2. In a gate valve as set forth in claim 1 wherein said opposed annular groove comprises an outer groove in said annular wall and an inner groove in said outer circumference of the seat, and spring means continuously urge the ring segments radially outwardly into seated position.

3. In a gate valve as set forth in claim 2 wherein said spring means comprises a wave spring mounted in said inner groove, and means are provided in said valve body to permit access to the segments by a tool for removal of the associated seats.

4. In a gate valve as set forth in claim 1 wherein said opposed annular grooves comprising an outer groove in said annular wall and an inner groove in said outer circumference of the seat, and spring means continuously urge the ring segments radially inwardly into a seated position.

5. In a gate valve as set forth in claim 4 wherein said spring means comprises a wave spring mounted in said outer groove to urge the ring segments radially inwardly, and means are provided in said seat to permit access to the segments by a tool for removal of the associated seats.

6. In a gate valve having a valve body with a valve chamber, an expanding gate valve assembly mounted within the valve chamber for movement between open and closed positions, said gate valve assembly including a gate and a segment with the gate and segment expanding laterally away from each other at the fully closed position, an annular seat pocket about the flow passage, and an annular seat mounted in the seat pocket, said annular seat having an outer peripheral surface and said seat pocket defining an outer peripheral wall facing said outer peripheral surface, said peripheral surface and said peripheral wall defining inner and outer opposed annular grooves therein; an improved means to retain the seat within the seat pocket comprising:

a pair of substantially semi-circular retainer ring segments mounted in said opposed annular groove and being of a thickness greater than the depth of one of the grooves to retain the annular seat within the seat pocket, the width of the ring segments being less than the width of said grooves to permit a limited floating movement of the seat within the seat pocket;

the sides of said grooves engaging the ring segments to limit the inward movement of the seat toward the gate assembly thereby to provide a predetermined clearance between the seat and the gate assembly when the gate assembly is in a collapsed position and traveling between open and closed positions thereby to minimize drag on the gate assembly.

7. In a gate valve as set forth in claim 6 wherein a wave spring is mounted in said inner groove to urge the ring segments radially outwardly toward said outer groove.

8. In a gate valve as set forth in claim 6 wherein a wave spring mounted in said outer groove to urge the ring segments radially inwardly toward said inner groove.

* * * * *